United States Patent [19]

Yasnovsky et al.

[11] 4,385,172

[45] May 24, 1983

[54] PREVENTION OF HORNIFICATION OF DISSOLVING PULP

[75] Inventors: V. M. Yasnovsky, Sloatsburg; Donald M. MacDonald, Monroe, both of N.Y.

[73] Assignee: International Paper Company, New York, N.Y.

[21] Appl. No.: 132,912

[22] Filed: Mar. 24, 1980

[51] Int. Cl.³ .......................... C08B 3/00; C08B 3/06
[52] U.S. Cl. ....................................... 536/70; 536/56; 536/58; 536/69; 536/101
[58] Field of Search ...................... 536/56, 70, 101, 58, 536/69

[56] References Cited

U.S. PATENT DOCUMENTS

| | | | |
|---|---|---|---|
| 1,670,156 | 5/1928 | Howell | 162/71 |
| 1,716,006 | 6/1929 | Rinman | 162/97 |
| 1,716,422 | 6/1929 | Clarke et al. | 536/70 |
| 2,105,498 | 1/1938 | Parrett et al. | 536/70 |
| 2,415,949 | 2/1947 | Holloway et al. | 536/70 |
| 2,591,106 | 4/1952 | Sutherland | 162/71 |
| 2,631,144 | 3/1953 | Hiller | 536/70 |
| 3,015,537 | 1/1962 | Gray et al. | 536/70 |
| 3,298,899 | 1/1967 | Laakso | 536/70 |
| 3,320,022 | 5/1967 | Hill | 536/70 |
| 4,174,997 | 11/1979 | Richter | 162/76 |

FOREIGN PATENT DOCUMENTS

| | | | |
|---|---|---|---|
| 332607 | 7/1930 | United Kingdom | 536/70 |
| 714163 | 8/1954 | United Kingdom | 536/70 |

OTHER PUBLICATIONS

Warwicker and Clayton, Journal of Applied Polymer Science, 13, (1969) p. 1037.
Sharkov et al, "Autoclave Treatment of Pulp to Increase Its Reactivity", in Khim, Mekh, Pererab, Drev, Drev. Otkhodov, 1977, vol. 3, pp. 23-25.

Primary Examiner—Ronald W. Griffin
Attorney, Agent, or Firm—Royal E. Bright; W. T. Zielinski

[57] ABSTRACT

Heat treatment of never-dried dissolving pulps prior to drying prevents or retards the hornification and consequent decrease in esterification reactivity which normally occurs on drying of untreated pulps.

7 Claims, No Drawings

PREVENTION OF HORNIFICATION OF DISSOLVING PULP

BACKGROUND OF THE INVENTION

This invention relates to compositions classified in the art of chemistry as cellulose esters and to processes for their preparation from dissolving pulp derived from lignocellulosic materials such as wood pulp.

The fibers of freshly bleached dissolving pulp while still in wet sheet form prior to entering the dryer section of a paper machine are in a highly swollen state. If they were to be used in an esterification reaction in this condition their reactivity would be quite high. Unfortunately, the nature of the dissolving pulp and the cellulose ester business requires that the pulp be dried by the pulp producer for storage and shipment to the processor who will esterify the pulp.

During the drying process shrinkage forces cause a partially irreversible collapse of the structure of the cellulose fibers. This effect, which is known as hornification, is especially pronounced in the case of dissolving pulps which have been post treated with cold alkali to remove hemicelluloses. As a result of hornification, pulp reactivity in chemical processes, in which reagents are unable to effectively swell the fibers of the pulp to reach the chemically reactive sites, is severely reduced. One such process is the process of cellulose esterification as it is practiced industrially.

The use of cold alkali purified dissolving pulps in esterification processes requires the use of harsher reaction conditions involving higher temperatures and/or longer reaction time in the activation step. Because of the constraints in their design and the expense of modifications such harsher conditions are not feasible in many esterification plants. As such harsher conditions are, obviously, a source of additional expense even for plants which are capable of providing the requisite equipment for their use, any modification of cold alkali purified dissolving pulp which would permit its activation for esterification under milder conditions would be of benefit to all users of the pulp for manufacture of cellulose esters and in addition would provide a broader base source of supply for those plants presently incapable of utilizing this type of pulp to maximum advantage in their operations.

CITATION OF RELEVANT LITERATURE

The most pertinent literature of which applicants are aware is an article by Sharkov et al. entitled, *Autoclave Treatment of Pulp to Increase its Reactivity* in Khim. Mekh. Pererab. Drev. Drev. Otkhodov, 1977, 3, 23-5. In this article prehydrolyzed kraft pulp was treated in an autoclave in the presence of water at temperature varying from 100° to 140° C. and for times varying from 15 minutes to 1 hour. The reactivity of pulp so treated, undried and after drying at various temperatures was then tested in the viscose reaction. The improved reactivity of the heat treated samples was demonstrated by reduced viscose filtration times and other parameters. A copy of the article and an informal translation thereof by one of the co-inventors of this application accompanies this application.

Although clearly indicating that the treatments described improve cellulose reactivity in viscose reactions, the Sharkov et al. article does not indicate that the pulp involved underwent any alkali purification and does not necessarily permit prediction as to the effect of the treatments described on cellulose reactivity in other processes such as esterification wherein the reagents have substantially different molecular sizes, and the treatment conditions are generally dissimilar.

U.S. Pat. Nos., 1,670,156; 1,716,006; 2,591,106; 3,015,537; 3,298,899; 3,320,022; and 4,174,997 are other background literature of which applicants are aware. None of these is felt to be particularly relevant or material to the patentability of the invention claimed herein. Copies of these patents are also enclosed for the Examiner's convenience.

SUMMARY OF THE INVENTION

The insertion provides a process for the preparation of a cellulose ester which comprises:

(a) treating cold alkali post treated dissolving pulp which has never been dried for about 0.5 to about 15 minutes at temperatures of from about 70° C. to about 170° C., at pH from about 2.0 to about 10.0, and at consistency from about 5% to about 75%;

(b) drying the pulp treated in step a above; and (c) esterifying the pulp dried in step b above.

The tangible embodiments produced by the process aspect of the invention possess the inherent applied use characteristic of being formable by known methods into filaments, films, lacquers and coatings as well as cast and molded three dimensional objects. A preferred embodiment of the process aspect of this invention is one wherein the treatment of step a is for 1 to 15 minutes at 70° to 110° C., pH 2.0 to 3.5 and 5% to 40% consistency with special mention being made of treatment at 95° to 100° C. and at 8% to 12% consistency. A second preferred embodiment is one wherein the treatment of step a is for 0.5 to 15 minutes at 150° to 170° C. at pH 5.0 to 10.0 and consistency 5% to 50%, special mention being made of treatment for 0.5 to 1.0 minutes and at 30% to 40% consistency. A third preferred embodiment is one wherein the treatment of step a is for 0.5 to 15 minutes at 150° to 170° C. at pH 5.0 to 10.0 and 60% to 75% consistency.

The invention further provides an improved process for the preparation of cellulose esters from cold alkali post treated dissolving pulp wherein said dissolving pulp is dried prior to esterification wherein the improvement comprises subsequent to said cold alkali post treatment prior to drying treating said dissolving pulp for about 0.5 to about 15 minutes at temperatures of from about 70° C. to about 170° C. at pH from about 2.0 to about 10.0 and at consistency from about 5% to about 75%.

DESCRIPTION OF THE PREFERRED EMBODIMENT

The manner of practicing the processes of the invention will now be illustrated with respect to a specific embodiment thereof namely the preparation of cellulose acetate (I) from softwood sulfite pulp (II).

II may be purified with cold alkali (120 g/l sodium hydroxide at 40° C. is convenient) in conventional fashion, washed thoroughly, the pulp slurry thickened to about 10%, the pH adjusted to about 3.0, conveniently by addition of sulfur dioxide and boiled for a short period of time, conveniently about 5 minutes. Following this treatment the pulp may be conventionally bleached and conventionally dried. The pulp so treated and dried may then be acetylated employing well known acetylation procedures. A convenient process is one wherein the pulp is activated by a large excess of acetic acid, conveniently about 350% on oven dry pulp weight, for a short period of time, at moderately elevated temperature, conveniently for about 10 minutes at about 38° C., followed by pretreatment with concentrated sulfuric acid, conveniently about 0.8% based on oven dry pulp weight, for a moderate period of time, conveniently 20 minutes, at about ambient temperature, about 20° C., followed by a "water killing" stage wherein a large excess of acetic anhydride is added, conveniently about 220% on oven dry pulp weight for a moderate period of time, conveniently about 20 minutes at about ambient temperature, followed by treatment with concentrated sulfuric acid, conveniently about 7.2% on oven dry pulp weight, for a moderate period of time, conveniently about 20 to about 30 minutes, at about ambient temperature. The reaction may then be terminated by the addition of aqueous acetic acid, conveniently 50% aqueous acetic acid in a quantity about 185% by weight on total pulp weight, and the acid dope so formed warmed, conveniently at about 44° C., for a time sufficient for hydrolysis, conveniently about 16 to 17 hours. I so produced may be recovered by standard means. Combination of the hydrolyzed acid dope with a sufficient quantity of 10% acetic acid to cause precipitation followed by recovery of the flakes of I so precipitated and drying is a convenient method.

One skilled in the art will recognize that in addition to the acetic acid and acetic anhydride illustrated for the preparation of cellulose acetate, any of the known carboxylic acids and anhydrides such as butyric and propionic may be substituted in analogous processes to prepare analogous esters. One skilled in the art will also recognize that in addition to the softwood sulfite pulp illustrated, one may substitute hardwood sulfite pulp as well as hardwood or softwood sulfate pulp in analogous processes to obtain analogous improvement in the esterification reactivity of each particular type of pulp. Similarly, the time, temperature, and exact proportions of reactants of each step of the conventional esterification portion of the process is not particularly critical and any set of conditions normally used in the art will be satisfactory.

In addition to the treatment at pH 3.0 and aqueous boiling temperature prior to bleaching described for the hornification prevention treatment, any of the other treatment conditions within the range described herein above may be applied, before or after bleaching to produce analogous results. Illustrative of these conditions are heating a thickened pulp (37% consistency) at initial pH 8.0 under 120 psi steam pressure and heating a sheet of 30% moisture content at 160° C. at pH about 9.0. One skilled in the art will recognize that prolonged heating at low pH values and high temperature will not be preferred because an unacceptable amount of cellulose hydrolysis may occur.

As used herein and in the appended claims the term "never dried" when applied to dissolving pulp means that during processing subsequent to initial delignification until after the heat treatment of this invention, the water content of the pulp has never been below 25%. The term post treatment refers to treatment after the initial chemical delignification of the wood, for example, by cooking in the sulfite or sulfate processes.

The following examples further illustrate the best mode comtemplated by the inventors for the practice of their invention.

EXAMPLE 1

Softwood sulfite pulp is purified in conventional fashion with cold alkali (120 g/l NaOH at 40° C.), washed with water and the resulting pulp slurry thickened to 10%. The thickened slurry is brought to pH 3.0 by addition of sulfur dioxide heated to boiling and held at boiling for 5 minutes. After cooling the pulp is bleached in conventional fashion and dried.

EXAMPLE 2

Prehydrolyzed hardwood kraft pulp is conventionally purified with "white liquor" (120 g/l apparent NaOH, sulfidity 20%, activity 88%) at 40° C., and bleached in conventional fashion. The pulp slurry is then thickened to 37% consistency, pH adjusted to 8.1 by addition of sodium bicarbonate and heated with saturated steam at 120 psi pressure (12 minutes up to pressure, 1 minute holding at pressure, 12 minutes pressure release). The pH of the pulp after heat treatment is 6.1. The treated pulp is then dried in conventional fashion.

EXAMPLE 3

A pulp sample of the same type as that used in Example 2 is purified with "white liquor" (125 g/l NaOH, sulfidity 25%, activity 100%) and conventionally bleached. Three handsheets (70 g/ft$^2$) are prepared in a standard papermaking mold after adjustment of the pulp slurry to pH 9.0 by addition of sodium bicarbonate and sodium sulfite. These handsheets are dried in conventional fashion until a 30% moisture content (70% solids) is reached. The sheets are then placed in a pressurized chamber providing rapid heat exchange and treated at 160° C. for 20 minutes (10 minutes up to temperature, 5 minutes at 160° C. and 5 minutes pressure release). The pH of the sheets after treatment is 7.5.

EXAMPLE 4

Pulp samples as tabulated below (30 g) are acetylated in the following general procedure:

Treatment of the pulp with glacial acetic acid (350% on an oven-dry pulp weight basis) for 10 minutes at 38° C. followed by treatment with concentrated sulfuric acid (0.8% on an oven-dry pulp weight basis) for 20 minutes at 20° C., followed by treatment with acetic anhydride (220% on an oven-dry pulp weight basis) for 20 minutes at 20° C., which in turn is followed by treatment with concentrated sulfuric acid (7.2% on an oven-dry pulp weight basis) for 20 to 30 minutes at 20° C. The reaction is then terminated by the addition of sufficient 50% aqueous acetic acid (185% on original pulp dry weight). The mixture is then treated at 44° C. for about 16 hours and 40 minutes to effect hydrolysis. After hydrolysis the turbidity, color are viscosity are determined and the results are tabulated hereinbelow. The cellulose acetate is then precipitated as flakes by the addition of 10% aqueous acetic acid (approximately 2 l). The flakes are collected, washed and dried (72 hours at 40° C.). Acetone dopes are prepared by tumbling dry cellulose acetate flakes (35 g) in acetone for 24 hours at room temperature to prepare a 16% solids (weight/weight) solution. Turbidity, color, viscosity and filterability of these dopes are also determined and tabulated hereinbelow.

Turbidity and color of the acid and acetone dopes are determined employing a Bausch and Lomb Spectronic 20 colorimeter. Viscosity of acid dopes is determined employing a Brookfield viscosimeter (Spindle No. 6). Viscosity of acetone dopes is determined employing the "ball fall" procedure (time required for a 3/32 inch stainless steel ball, Atlas Ball Code 4E44, to fall 15 cm through the solution). Filterability of acetone dopes is determined employing filtration of the dope through Johnson and Johnson C-14 cloth (5/16th inch opening, 30 psi pressure). Data obtained is converted to standard values according to the "Standard Law of Filterability" [Hermans, P. H. and Bredee, M. L., Rec. Trav. Chim., 54, 680 (1935)].

|   | Sample Description | Acid Dope Properties | | | Acetone Dope Properties | | | |
|---|---|---|---|---|---|---|---|---|
|   |   | Turbidity (Absorbance at 625 nm) | Color (Absorbance at 425 nm) | Viscosity (cps) | Turbidity (Absorbance at 625 nm) | Color (Absorbance at 425 nm) | Viscosity (bfs) | Filtration g/cm$^2$ |
| A | Hot alkali post treated softwood sulfite pulp | 7.6 ± 1.7 | 17.5 ± 1.3 | 150 ± 40 | 12.5 ± 5.1 | 13.8 ± 5.0 | 13.3 ± 5.1 | 82 ± 46 |
| B | Cold alkali post treated softwood sulfite pulp | 25.1 | 34.0 | 160 | 27.5 | 35.0 | 19.1 | 28.0 |
| C | Cold alkali post treated softwood sulfite pulp, heat treated at 100° C., for 5 min. consistency 10%, pH 3.0 (Example 1) | 16.5 | 21.5 | 93 | 14.0 | 20.0 | 8.1 | 66.8 |
| D | Cold alkali post treated hardwood sulfate pulp | 26.0 | 31 | 77 | 47.5 | 45.5 | 9.4 | 11.0 |
| E | Cold Alkali post treated hardwood sulfate pulp, heat treated at 168° C., for 1 min. consistency 37%, initial pH 8.1, final pH 6.1 (Example 2) | 7.5 | 12.5 | 102 | 27.5 | 22.5 | 10.7 | 42.1 |
| F | Cold alkali post treated hardwood sulfate pulp, heat treated at 160° C., for 5 min. consistency 70%, initial pH 9.0, final pH 7.5 (Example 3) | 165 | 25.5 | 143 | 57 | 33 | 29.2 | 19.7 |

Examination of the results shows that the heat treatment of Sample C, otherwise processed analogously to the control samples has improved acid dope clarity and acetone dope filterability approaching that of the more mildly processed control Sample A. Samples E and F otherwise processed the same as control Sample D show improved acetone dope filterability over Sample D.

The subject matter which applicants regard as their invention is particularly pointed out and distinctly claimed as follows:

We claim:

1. A process for the preparation of cellulose esters of carboxylic acids which comprises:
   (a) treating cold alkali post treated dissolving pulp which has never been dried for about 0.5 to about 15 minutes at temperatures of from about 70° C. to about 170° C. at pH of from about 2.0 to about 10.0 and at consistency from about 5% to about 75%;
   (b) drying the pulp treated in step a above; and
   (c) esterifying the pulp dried in step b above by treating with a carboxylic acid or a carboxylic acid anhydride.

2. A process as defined in claim 1 wherein the treatment in step a is for from 1 to 15 minutes at 70° to 110° C., pH 2.0 to 3.5 and 5% to 40% consistency.

3. A process as defined in claim 2 wherein the treatment is at 95° to 100° C. and at 8% to 12% consistency.

4. A process as defined in claim 1 wherein the treatment of step a is for from 0.5 to 15 minutes at 150° to 170° C. at pH 5.0 to 10.0 and consistency 5% to 50%.

5. A process as defined in claim 4 wherein the treatment is for 0.5 to 1.0 minutes and at 30% to 40% consistency.

6. A process as defined in claim 1 wherein the treatment of step a is for 0.5 to 15 minutes at 150° to 170° C. at pH 5.0 to 10.0 and 60% to 75% consistency.

7. A process as defined in claims 1, 2, 3, 4, 5, or 6 wherein the esterification of step c is performed with acetic acid and acetic anhydride.

* * * * *